Jan. 13, 1953  F. N. BLACKMORE  2,625,656
RATE METER
Filed April 29, 1950  2 SHEETS—SHEET 1
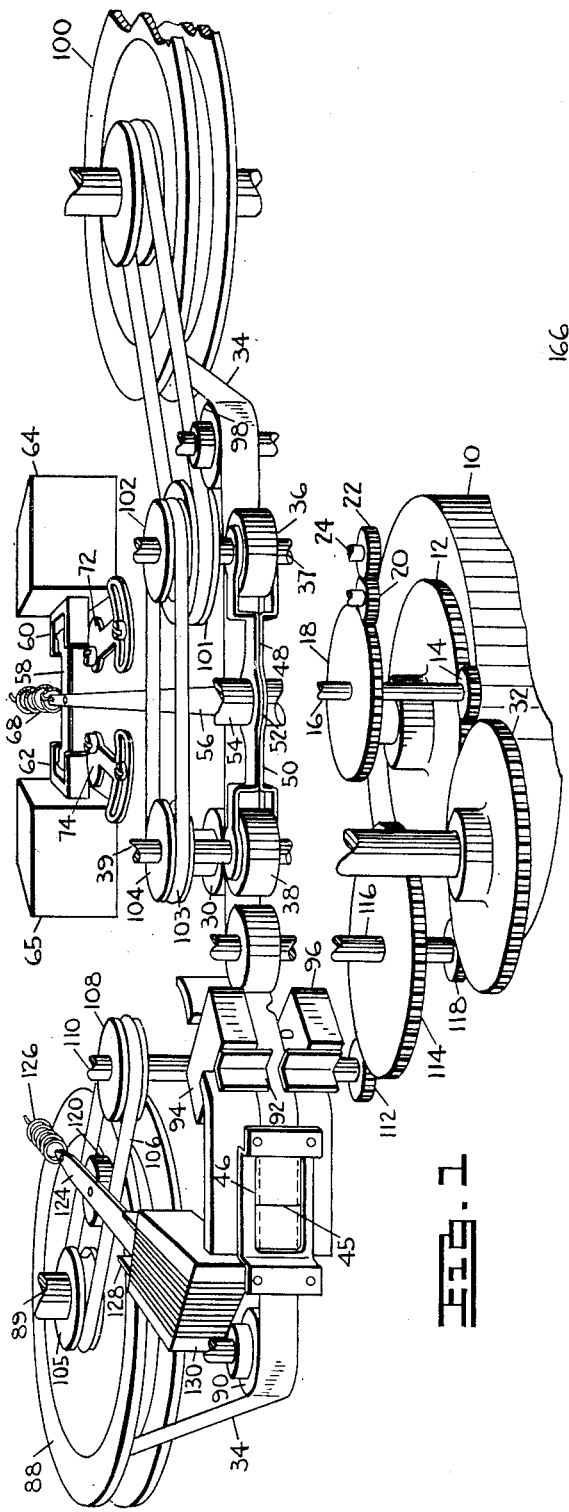
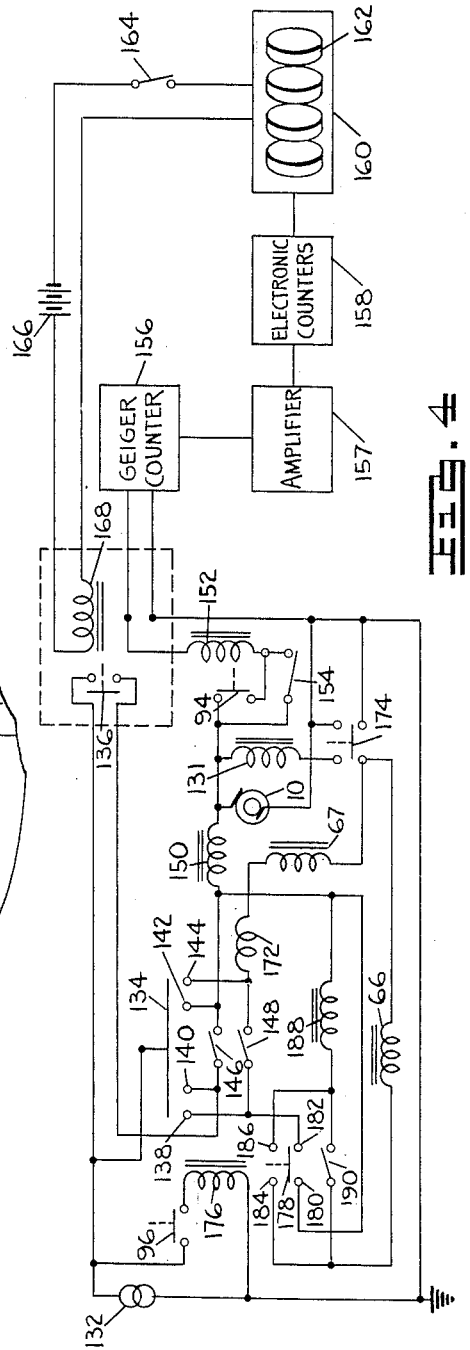
INVENTOR.
FRED N. BLACKMORE
BY
Ellsworth R. Roston
ATTORNEY Jan. 13, 1953  F. N. BLACKMORE  2,625,656
RATE METER Filed April 29, 1950  2 SHEETS—SHEET 2

INVENTOR.
FRED N. BLACKMORE
BY
Ellsworth R. Roston
ATTORNEY

Patented Jan. 13, 1953

2,625,656

UNITED STATES PATENT OFFICE 2,625,656

RATE METER

Fred N. Blackmore, Royal Oak, Mich., assignor to Bendix Aviation Corporation, Detroit, Mich., a corporation of Delaware Application April 29, 1950, Serial No. 159,105

17 Claims. (Cl. 250—83.6)

This invention relates to apparatus for measuring the rate at which radioactive emanations occur and more particularly to apparatus for measuring the average rate at which a predetermined number of radioactive emanations occur. The invention is especially adapted to be used in conjunction with and to supplement apparatus for counting a predetermined number of radioactive emanations.

Apparatus now exists for counting radioactive emanations. Such apparatus employs a Geiger counter to convert radioactive emanations into pulses of electrical energy and suitable electrical circuits to count the electrical pulses. A clock is also provided in synchronization with the counter so as to start running at the same time that a count of the radioactive emanations is begun. By calculating the ratio between the count of radioactive emanations and the time during which the emanations have been counted, the rate of radioactive emanations per unit of time may be determined. Such mental calculations require time and effort and often produce inaccuracies. However, instantaneous and completely reliable indications are often required.

This invention provides apparatus for instantaneously indicating the rate at which a predetermined number of radioactive emanations occur. The invention employs a tape which is calibrated on a hyperbolic scale in terms of units of radioactive emanations per unit of time. The tape is linearly driven by a motor past a hair line pointer as the count of radioactive emanations is being made. When the count has been completed the motor stops and the number on the calibrated scale adjacent the hair line pointer gives a direct indication of the average rate of radioactive emanations.

An object of this invention is to provide apparatus for instantaneously indicating the rate at which radioactive emanations occur.

Another object of the invention is to provide apparatus for instantaneously indicating the average rate at which a predetermined number of radioactive emanations occur.

A further object is to provide apparatus of the above character which is adapted to be operated in conjunction with and to supplement apparatus for counting radioactive emanations, so as to give a direct indication of the rate of radioactive emanations.

Still another object is to provide apparatus of the above character which is simple, compact, efficient and reliable.

Other objects and advantages of the invention will be apparent from a detailed description of the invention and from the appended drawings and claims.

In the drawings:

Figure 1 is a perspective view of apparatus for automatically indicating the rate at which a predetermined number of radioactive emanations occur;

Figure 4 is a circuit diagram of the electrical system for operating the apparatus shown in Figures 1 and 2.

Figure 2:
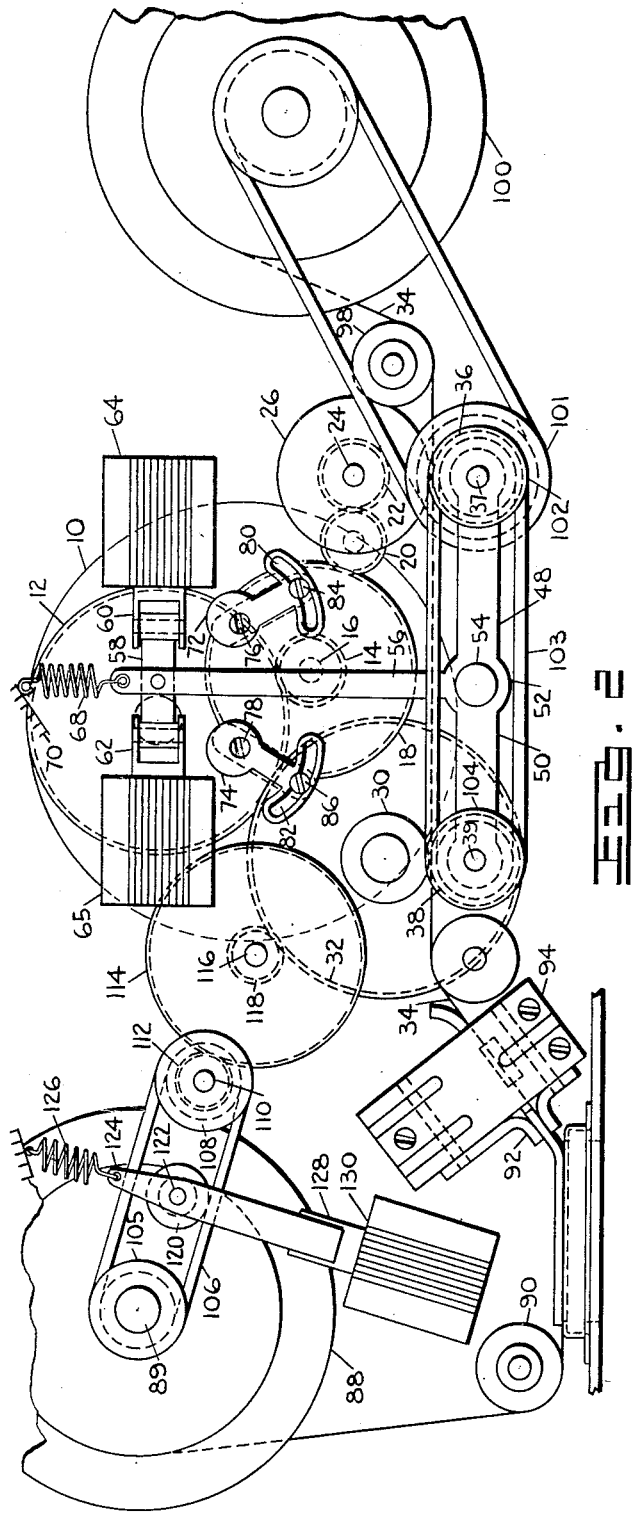
Figure 2 is a top plan view of the apparatus shown in Figure 1.

In one embodiment of the invention, a motor 10, such as a synchronous motor, is provided. The motor drives a gear 12 in mesh with a pinion gear 14 on a shaft 16. A gear 18 is also mounted on the shaft in mesh with an idler gear 20, which in turn drives a gear 22 mounted on a shaft 24. The shaft 24 carries a resilient roller 26, which may be made from a material such as rubber. In addition to driving the rubber roller 26, the gear 12 also drives a rubber roller 30 through a gear 32.

Figure 3:
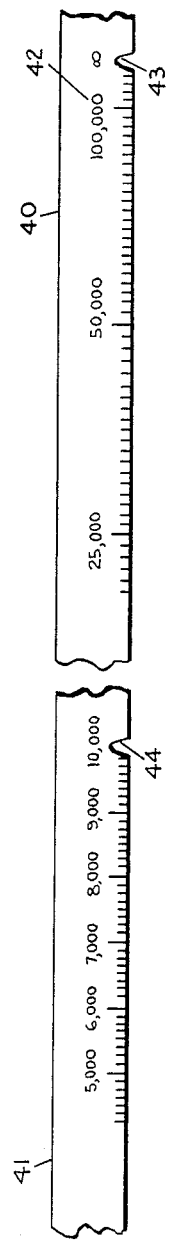
Figure 3 is a front elevational view of a calibrated tape for indicating, in the apparatus shown in Figures 1 and 2, the average rate of radioactive emanations.

A tape 34 is positioned between the rubber roller 26 and a steel roller 36 mounted on a shaft 37, and between the rubber roller 30 and a steel roller 38 mounted on a shaft 39. The tape may be made from a material which has a low coefficient of heat expansion such as an alloy containing approximately 36.5% nickel, 63% iron, and 0.5% manganese. The tape is divided into two continuous portions 40 and 41 (Figure 3), each of which is provided with numerical calibrations 42 adapted to indicate units of radioactivity per unit of time. The first portion 40 is calibrated on a relatively expanded scale, with the highest number appearing at the beginning of the tape and with the numerical values along the tape decreasing in a harmonic progression. The second portion 41 is similarly calibrated on a somewhat contracted scale. Notches 43 and 44 are provided at the beginning of the portions 40 and 41, respectively, to operate switches, hereinafter to be designated, which close circuits controlling the speed at which the tape is driven past a hair-line pointer 45 at the center of a window 46. The speed at which the portions 40 and 41 are driven is dependent upon their scale of calibration, the portion 40 being driven at a faster speed than the portion 41.

The steel rollers 36 and 38 are attached to opposite legs 48 and 50 of a yoke 52 which is pivoted on a shaft 54. A third leg 56 substantially perpendicular to the legs 48 and 50 is pivotally attached to a support member 58, the ends of which are attached to armatures 60 and 62 of solenoids 64 and 65, respectively, the solenoids having windings 66 and 67 (Figure 2), respectively. A spring 68 is attached at one end to the leg 56 and at the other end to a housing 70 to return the yoke 52 to a neutral position when neither the solenoid 64 nor the solenoid 65 is energized.

The pivotal movement of the yoke 52 on the support member 58 is limited in one direction by a link 72 and in the other direction by a link 74. The links 72 and 74 are pivoted at one end on off-center pins 76 and 78, respectively, and are slidable at the other end in slots 80 and 82, respectively. Screws 84 and 86 are provided to secure the links 72 and 74 in their respective slots after the links have been adjusted to apply a proper pressure between the rollers 26 and 36 when the solenoid 65 is energized or between the rollers 30 and 38 when the solenoid 64 is energized.

The tape 34 is unwound from a reel 88 carried by a shaft 89 and is tensioned by an idler pulley 90 before passing between pairs of brackets 92 which support microswitches 94 and 96. The microswitches 94 and 96 control the operation of solenoids 65 and 64, respectively. After traveling past the microswitches 94 and 96, the tape passes between the rollers 30 and 38 and between the rollers 26 and 36. The tape is then tensioned by an idler pulley 98 before being wound on a reel 100. The reel is belt-driven by a pulley 101 mounted on the shaft 37. A pulley 102 is also mounted on the shaft 37 and is coupled by a belt 103 to a pulley 104 on the shaft 39 so as to drive the roller 38.

The shaft 89 carries a pulley 105, and a belt 106 passes over the pulley 105 at one end and over a pulley 108 at the other end. The pulley 108 is mounted on a shaft 110 which carries a gear 112 in mesh with a gear 114. The gear 114 is in turn mounted on a shaft 116 which carries a gear 118 driven by the gear 32. During the rewinding operation, the belt 106 is tensioned by a wheel 120 which rotates on a shaft 122 carried by an arm 124. The arm 124 is attached at one end to a spring 126 and at the other end to an armature 128 of a solenoid 130. The solenoid 130 has a winding 131 (Figure 2).

The motor 10, solenoid windings 66 and 67, microswitches 94 and 96, and solenoid winding 131 are connected in the circuit shown in Figure 4. Power for the circuit is provided by a suitable alternating power supply 132, one side of which is grounded. The other side of the power supply is connected to the movable contact of a manually operated switch 134 and to a stationary contact of a switch 136. The switch 134 is provided with four stationary contacts 138, 140, 142 and 144. The contacts 140 and 142 are connected to the stationary and movable contacts of a holding switch 146 which maintains the operation of the motor 10 after the switch 134 is released, and the contacts 138 and 144 are connected to a switch 148 for holding the solenoid winding 67 in operation after the switch 134 is released. The contact 140 is also connected to the other stationary contact of the switch 136.

The holding switch 146 is connected through a solenoid winding 150 to one side of the motor 10, the other side of which is grounded. The solenoid winding 150, which is adapted to close the switch 146 when energized, is also connected to a stationary contact of the microswitch 94. The other stationary contact of the microswitch 94 is connected to a solenoid winding 152 which actuates, when energized, a holding switch 154 connected across the stationary contacts of the microswitch 94. The solenoid winding 152 is in turn connected to the positive electrode of a Geiger counter 156, the negative electrode of the counter being grounded. Amplifier stages 157 are connected to the Geiger counter 156 and are biased by the output from the counter. Electronic counting stages 158 are connected to the amplifier 157 to count the number of electrical pulses produced by the Geiger counter 156. A gear train 160 may be provided in association with the counters 158 to give a visual indication on decimally calibrated wheels 162 of the number of radioactive emanations that have been counted. A switch 164 is associated with the counter 158. The switch is closed when the counters start to count a predetermined number of pulses and is opened when the counters have completed the count. The switch 164 is connected in series with a battery 166 and a solenoid winding 168, the solenoid being operative to actuate the switch 136.

As previously explained, the switch 148 is connected between the stationary contacts 138 and 144 of the switch 134. The switch 148 is closed upon the energization of a solenoid winding 172 which is connected at one end to the terminal 144 and at the other end to the solenoid winding 67. The solenoid winding 67 is in turn connected to a manually operated doublethrow switch 174 which forms a continuous circuit between the solenoid winding and ground in one position of the switch. In the other position of the switch, the solenoid winding 131 is placed in parallel with the motor 10.

Just as the solenoid winding 67 is energized upon the closing of the microswitch 94 to produce a movement of the tape 34 at a relatively high speed, the solenoid winding 66 is energized upon the closing of the microswitch 96 to produce a movement of the tape at a reduced speed. When the switch 96 is closed, a solenoid winding 176 is placed directly across the power supply 132. A double-throw switch 178 having stationary contacts 180, 182, 184, and 186, is associated with the solenoid winding 176. The contacts 180 and 182 are connected to the contacts 142 and 138, respectively, of the switch 134 and are shorted by the movable contact in the inoperative position of the switch. The contact 184 is connected to the solenoid winding 66 and the contact 186 is connected to one side of a solenoid winding 188, the other side of which is connected to the contact 142. A switch 190 is connected between the terminals 184 and 186 and is closed upon the energization of the solenoid winding 188.

To operate the apparatus disclosed above, the switch 134 is closed, causing a continuous circuit to be established which includes the power supply 132, the movable contact of the switch 134, the contact 138, the contacts 182 and 180 of the switch 178, the solenoid winding 150 and the motor 10. At the same time, a continuous circuit is established which includes the power supply 132, the movable contact of the switch 134, the contact 144, the solenoid winding 172, the solenoid winding 67 and the switch 174 in its inoperative position. When the solenoid winding 67 is energized, it attracts its armature 62 to the left in Figures 1 and 2 and produces a counter-clockwise pivotal movement of the yoke 52 such that the tape 34 is pressed by the roller 36 against the roller 26. The motor then drives the tape at a relatively high but constant speed through the gears 12, 14, 18, 20 and 22.

After the initial portion of the tape has moved past the microswitches 94 and 96, the notch 43 abuts the movable contact on the microswitch 94. The microswitch closes and establishes a continuous circuit through the Geiger counter 156 and the counters 158. The radioactive emanations which enter the Geiger counter strike gas particles in the counter and ionize these particles into protons and electrons. The electrons are attracted to the positive electrode of the Geiger counter and the protons to the negative electrode. Thus, each radioactive emanation causes a current pulse to flow through the Geiger counter and a positive voltage pulse to be produced on the grid of the amplifier 157. The resultant output pulses from the amplifier are counted by the counters 158 and a visual indication of the number of pulses so counted is provided by the wheels 162.

At the same time that the counters 158 start to count the radioactive emanations, the switch 164 is closed and the solenoid winding 168 is energized, closing the switch 136. Upon the closure of the switch 136, the switch 134 may be released, since the motor 10 operates through a circuit which includes the power supply 132, the switch 136, the holding switch 146 and the solenoid winding 150, the switch 146 being closed by the solenoid winding 150 when the switch 134 is initially closed. Furthermore, the solenoid winding 67 is energized through a circuit which includes the power supply 132, the switch 136, the holding switch 146, the contacts 180 and 182, the holding switch 148, the solenoid winding 172, the solenoid winding 67 and the switch 174.

When the tape has moved through a distance which brings the notch 44 beneath the movable contact of the switch 96, the switch closes and the solenoid winding 176 is energized. Energization of the solenoid winding 176 causes the movable contact of the switch 178 to be attracted from the contacts 180 and 182 to the contacts 184 and 186. The solenoid windings 67 and 172 are de-energized by the actuation of the switch 178 and the holding switch 148 is released. At the same time, the solenoid winding 66 is energized through a circuit which includes the power supply 132, the switch 136, the holding switch 146, the solenoid winding 188, the contacts 186 and 184 of the switch 178, the solenoid winding 66 and the switch 174. The holding switch 190 is closed when the solenoid winding 188 is energized so as to provide a continuous circuit through the solenoid winding 66 after the microswitch 96 opens and the movable contact of the switch 178 returns to the contacts 180 and 182. When the solenoid winding 66 is energized, it attracts its armature 60 to the right in Figures 1 and 2 so that the yoke 52 is pivoted in a clockwise direction. The tape 34 is then pressed between the rollers 30 and 38 and is driven at a relatively low but constant speed through the gears 12 and 32.

The Geiger counter 156 and the counters 158 are operated until a predetermined number of radioactive emanations—e. g., 10,000 or 100,000—have been counted. At the end of the count, the switch 164 is opened and the solenoid winding 168 is de-energized, causing the switch 136 to be opened. Since the switch 136 serves as a master switch after the switch 134 is released, the motor 10 stops.

The position of the tape relative to the hair line pointer 45 is determined by the time required to count the predetermined number of radioactive emanations. For example, the tape passes through only a short distance for a predetermined number of radioactive emanations when the emanations are occurring at a relatively high rate. Since the tape is provided with its highest readings at the beginning of the tape and with the readings decreasing along the tape in a hyperbolic calibration, a high reading is obtained for a relatively high rate of radioactive emanations. If the rate is relatively low, the tape passes through a greater distance before the predetermined number of radioactive emanations is counted, and the increase in time causes a relatively low number to appear adjacent the hair line pointer 45.

The position of the decimal in the number adjacent the hair line pointer 45 may be instantaneously determined from the number of radioactive emanations which have been counted. Generally, the total count will be a round number like 10,000 or 100,000. Thus, if the tape stops in one position when the count is 100,000 and in the same position when the count is 10,000 emanations, the number read in the first case will be ten times higher than the number read in the second case. If desired, the counters 158 may be provided with a multi-positional switch, with the switch being adapted in different positions to shut off the counters when 1,000 or 10,000 or 100,000, etc. emanations have been counted. The number adjacent each position of the switch may be provided with a distinctive color. A plurality of scales corresponding to the different positions of the counter switch may be provided on the tape 34 and the calibrations on each scale may be colored so as to correspond to the color of the number at the corresponding position of the switch. Such a color code is adapted to provide an instantaneous reading for any setting of the switch and for any position of the tape 34.

The portion 40 of the tape is provided with an expanded scale because of the rapid changes in the average rate which occur during the first few units of time. For example, if 10,000 emanations are counted in one second the average rate per second is 10,000. If two seconds are required to count 10,000 emanations, the average rate is 5,000. By expanding the scale on the portion 40 and driving the portion past the window 46 at a proportionately increased speed, intermediate readings may be obtained. Only the scale of the initial portion 40 need be expanded, since corresponding changes in time do not produce corresponding changes in rate when the time required to count a predetermined number of radioactive emanations is relatively long. Thus, with a count of 10,000 emanations, the rate changes only from 1,000 to 909 when the time changes from 10 to 11 seconds.

To rewind the tape the switches 134 and 174 are manually operated. The operation of the switches 134 and 174 places the solenoid winding 131 across the motor and produces an energization of the solenoid winding and the motor. The solenoid attracts its armature 128 downwardly in Figure 1 and actuates the pulley 120 so as to tension the belt 106 between the pulleys 105 and 108.

As a result, the gears 12, 32, 118, 114, and 112 operate and cause the belt 106 to move in a direction to rewind the tape on the reel 88.

Although this invention has been disclosed and illustrated with reference to particular applications, the principles involved are susceptible of numerous other applications which will be apparent to persons skilled in the art.

What is claimed is:

1. Apparatus for measuring the rate of occurrence of a predetermined number of radioactive emanations, including, means for counting the predetermined number of radioactive emanations, a tape calibrated to indicate the rate at which radioactive emanations occur, and means operative during the count of radioactive emanations to drive the tape until the predetermined number of radioactive emanations has been counted.

2. Apparatus for measuring the rate of occurrence of a predetermined number of radioactive emanations, including, means for converting the radioactive emanations into pulses of electrical energy, means for counting the pulses of electrical energy, a tape hyperbolically calibrated in terms of radioactive emanations per unit of time, and means operative during the count of radioactive emanations to drive the tape until the predetermined number of radioactive emanations has been counted.

3. Apparatus for measuring the rate of occurrence of a predetermined number of radioactive emanations, including, a tape hyperbolically calibrated in units of radioactivity per unit of time, a motor for driving the tape, means for counting the predetermined number of radioactive emanations, means associated with the tape for starting the count of radioactive emanations at a predetermined position in the tape, and means for stopping the motor when the predetermined number of radioactive emanations has been counted.

4. Apparatus for measuring the rate of occurrence of a predetermined number of radioactive emanations, including, means for counting the predetermined number of radioactive emanations, a tape hyperbolically calibrated in terms of radioactive emanations per unit of time, means for initially driving the tape at a relatively high speed for a predetermined period of time, means for thereafter driving the tape at a reduced speed, and means for simultaneously stopping the tape and the counting means when the predetermined number of radioactive emanations has been counted.

5. Apparatus for measuring the rate of occurrence of a predetermined number of radioactive emanations, including, a tape divided into two continuous portions, one of the portions being calibrated on an expanded scale in terms of radioactive emanations per unit of time, the other portion being calibrated on a contracted scale in terms of radioactive emanations per unit of time, means for driving the first portion of the tape at a relatively high speed, means for driving the second portion of the tape at a correspondingly reduced speed, means for counting the predetermined number of radioactive emanations, and means for stopping the tape when the predetermined number of radioactive emanations has been counted.

6. Apparatus for measuring the rate of occurrence of a predetermined number of radioactive emanations, including, means for counting the predetermined number of radioactive emanations, a tape divided into two continuous portions, one of the portions being hyperbolically calibrated on an expanded scale in terms of radioactive emanations per unit of time, the other portion being hyperbolically calibrated on a reduced scale in terms of radioactive emanations per unit of time, means for driving the first and second portions of the tape at speeds proportional to the scales of these parts, means for starting the count of radioactive emanations at the beginning of the expanded scale, and means for simultaneously stopping the tape and the counting means when the predetermined number of radioactive emanations has been counted.

7. Apparatus for measuring the rate of occurrence of a predetermined number of radioactive emanations, including, means for counting the predetermined number of radioactive emanations, a tape divided into two continuous portions, one of the portions being hyperbolically calibrated on an expanded scale in terms of radioactive emanations per unit of time, the other portion being hyperbolically calibrated on a reduced scale in terms of radioactive emanations per unit of time, a motor operative at a substantially constant speed, means for converting the speed of the motor into a speed conforming to the expanded scale on the tape, means for converting the speed of the motor at the beginning of the second portion into a speed conforming to the contracted scale, and means for starting the count of radioactive emanations at the beginning of the expanded scale.

8. Apparatus for measuring the rate of occurrence of a predetermined number of radioactive emanations, including, means for counting the predetermined number of radioactive emanations, means calibrated to indicate the rate at which the predetermined number of radioactive emanations occur, means for driving the rate indicator, means for initially activating the counting means at a predetermined position of the rate indicator, and means for halting the operation of the rate indicator when the predetermined number of radioactive emanations has been counted.

9. Apparatus for measuring the rate of occurrence of a predetermined number of radioactive emanations, including, means for counting the predetermined number of radioactive emanations, means calibrated to indicate the rate at which the predetermined number of radioactive emanations occur, a motor for mechanically driving the rate indicator, control means operative on the indicator to magnify the rate calibrations over a predetermined portion of the indicator range, means for activating the counting means at a predetermined position of the rate indicator, means for halting the operation of the rate indicator when the predetermined number of radioactive emanations has been counted, and means operative to return the rate indicator to its starting position after the radioactive emanations have been counted.

10. Apparatus for measuring the rate of occurrence of a predetermined number of radioactive emanations, including, means for counting the predetermined number of radioactive emanations, a motor, a rate indicator driven by the motor at different speeds, each substantially constant, over different parts of its range, a plurality of scales on the indicator hyperbolically calibrated in accordance with the different speeds of movement of the indicator to show the rate at which the radioactive emanations occur, means operative to initiate the count of radioactive emanations at the beginning of the first rate scale, means for discontinuing the count of radioactive emanations when the predetermined number has been counted, and means for returning the indicator to its starting position upon the completion of the count.

11. Apparatus for measuring the rate of occurrence of a predetermined number of radioactive emanations, including, means for counting the predetermined number of radioactive emanations, a motor, a tape linearly driven by the motor, a hyperbolically calibrated scale on the tape, a switch, means on the tape for operating the switch at the beginning of the hyperbolically calibrated scale, means controlled by the operation of the switch for initiating the count of radioactive emanations, and means for simultaneously discontinuing the count of radioactive emanations and stopping the motor when the predetermined number of radioactive emanations has been counted.

12. Apparatus for measuring the rate of occurrence of a predetermined number of radioactive emanations, including, a motor, a tape adapted to be linearly driven by the motor, first markings on the tape hyperbolically calibrated on an expanded scale, second markings on the tape hyperbolically calibrated on a reduced scale relative to the first markings, a pair of solenoids, pivotable means disposed between the solenoids and adapted upon the activation of the first solenoid to couple the tape to the motor for movement at a speed proportional to the expanded scale and upon activation of the second solenoid to couple the tape to the motor for movement at a speed proportional to the reduced scale, means for initiating the count of radioactive emanations at the beginning of the expanded scale, means for counting only the predetermined number of radioactive emanations and for stopping the motor upon the completion of the count, and means for returning the tape to its starting position upon the completion of the count.

13. Apparatus for measuring the rate of occurrence of a predetermined number of radioactive emanations, including, means for counting the predetermined number of radioactive emanations, a motor, a tape adapted to be linearly driven by the motor at predetermined speeds, first markings on the tape hyperbolically calibrated on an expanded scale, second markings on the tape hyperbolically calibrated on a reduced scale relative to the first markings, a first pair of rollers disposed between the tape, a first solenoid, means operative by the solenoid to press the rollers against the tape so as to drive the tape at a speed corresponding to the expanded scale of the first markings, means positioned on the tape at a predetermined marking on the expanded scale to initiate the count of radioactive emanations, a second pair of rollers disposed between the tape, a second solenoid, means operative by the second solenoid to press the second pair of rollers against the tape so as to drive the tape at a speed corresponding to the reduced scale of the second markings, means positioned on the tape at the end of the expanded scale to actuate the second solenoid, and means for stopping the motor and discontinuing the count of radioactive emanations when the predetermined number has been counted.

14. Apparatus for measuring the rate of occurrence of a predetermined number of radioactive emanations, including, means for counting the predetermined number of radioactive emanations, means hyperbolically calibrated to indicate the rate at which the predetermined number of radioactive emanations occur, a motor for driving the indicating means, a switch associated with the motor and operative upon a predetermined position of the indicating means to initiate the count of radioactive emanations, and means operative upon the predetermined count of radioactive emanations to discontinue the count and simultaneously stop the motor.

15. Apparatus for measuring the rate of occurrence of a predetermined number of radioactive emanations, including, means for counting the predetermined number of radioactive emanations, means hyperbolically calibrated to indicate the rate at which the predetermined number of radioactive emanations occur, a motor for driving the indicating means, a switch, means associated with the indicating means for operating the switch at the beginning of the hyperbolic calibrations, means controlled by the operation of the switch for initiating the count of radioactive emanations, and means operative upon the predetermined count of radioactive emanations to discontinue the count and simultaneously stop the motor.

16. Apparatus for determining the rate at which a predetermined number of radioactive emanations occur, including, means for counting the predetermined number of radioactive emanations, means for mechanically determining the ratio between the predetermined number of radioactive emanations and the time required to count the emanations, means for synchronizing the operation of the counting and ratio means, and means for simultaneously stopping the counting and ratio means upon the completion of the count of radioactive emanations.

17. Apparatus for determining the rate at which a predetermined number of radioactive emanations occur, including, means for counting the predetermined number of radioactive emanations, means for determining the time required to count the radioactive emanations, means operative upon the count of radioactive emanations to provide an indication of the ratio between the radioactive count and the time required to obtain the count, means for synchronizing the operation of the counting and indicating means, and means for simultaneously stopping the counting and indicating means upon the completion of the count of radioactive emanations.

FRED N. BLACKMORE.

REFERENCES CITED

The following references are of record in the file of this patent:

UNITED STATES PATENTS

| Number | Name | Date |
|---|---|---|
| 2,103,077 | Herron | Dec. 21, 1937 |
| 2,328,304 | Sorensen | Aug. 31, 1943 |
| 2,500,473 | Spaeth | Mar. 14, 1950 |

OTHER REFERENCES

Predetermined Counters, Electronics, Mar. 1947, pages 120–123, 235–92E.

The Review of Scientific Instruments, July 1946, vol. 17, #7, pages 255–261.